(12) United States Patent
Watanabe et al.

(10) Patent No.: US 11,913,917 B2
(45) Date of Patent: Feb. 27, 2024

(54) CHROMATOGRAPH AND SAMPLE INJECTION APPARATUS

(71) Applicant: SHIMADZU CORPORATION, Kyoto (JP)

(72) Inventors: Satoru Watanabe, Kyoto (JP); Takashi Inoue, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 381 days.

(21) Appl. No.: 17/125,050

(22) Filed: Dec. 17, 2020

(65) Prior Publication Data

US 2021/0285919 A1    Sep. 16, 2021

(30) Foreign Application Priority Data

Mar. 11, 2020 (JP) ................................ 2020-041823

(51) Int. Cl.
   *G01N 30/24* (2006.01)
   *G01N 30/36* (2006.01)
   G01N 30/02 (2006.01)
   G01N 30/38 (2006.01)

(52) U.S. Cl.
   CPC ............. *G01N 30/24* (2013.01); *G01N 30/36* (2013.01); *G01N 2030/027* (2013.01); *G01N 2030/385* (2013.01)

(58) Field of Classification Search
   CPC .. G01N 30/24; G01N 30/36; G01N 2030/385; G01N 2030/027; G01N 35/1004; G01N 30/02; G01N 2030/207

USPC ......... 73/61.55, 61.52, 61.56, 61.59, 864.21, 73/864.22, 863.72; 422/70; 210/656, 210/198.2

See application file for complete search history.

(56) References Cited

U.S. PATENT DOCUMENTS

2011/0209532 A1   9/2011   Maeda
2018/0284079 A1   10/2018  Yasunaga

FOREIGN PATENT DOCUMENTS

| CN | 110455970 | * 11/2019 |
| JP | 2011-179826 A | 9/2011 |
| JP | 2014048248 | * 3/2014 |

(Continued)

OTHER PUBLICATIONS

Office Action dated Mar. 2, 2023, in corresponding Japanese Application No. 2020-041823, 6 pages.

*Primary Examiner* — Robert R Raevis
(74) *Attorney, Agent, or Firm* — Maier & Maier, PLLC

(57) ABSTRACT

An autosampler includes a retention path for injecting a sample into a mobile phase that flows through an analysis path to a column, the retention path including a needle at a downstream end and holding the sample, an injection path including a port at an upstream end for injecting into the analysis path, the sample injected from the needle into the port, a low-pressure path having an upstream end connected to a pump, and a valve that can switch between a first state in which an upstream analysis path and a downstream analysis path are connected and a downstream end of the low-pressure path and an upstream end of the retention path are connected and a second state in which the upstream analysis path and the upstream end of the retention path are connected and the downstream end of the injection path and the downstream analysis path are connected.

18 Claims, 11 Drawing Sheets

(56) References Cited

FOREIGN PATENT DOCUMENTS

JP       2018-169350 A    11/2018
JP          6547853    *   7/2019

* cited by examiner

CHROMATOGRAPH AND SAMPLE INJECTION APPARATUS

FIELD

The present invention relates to a chromatograph and a sample injection apparatus.

BACKGROUND

A liquid chromatograph is an analysis apparatus used for chromatographic analysis in which a sample to be analyzed is introduced into a column together with a mobile phase and a component contained in the sample is separated, a liquid being adopted as the mobile phase. An autosampler (which is also referred to as a "sample injection apparatus" below) has conventionally been incorporated in a liquid chromatograph (see, for example, Japanese Patent Laying-Open No. 2018-169350). The autosampler is an apparatus that injects a liquid sample into a mobile phase in an analysis flow path of the liquid chromatograph.

SUMMARY OF THE INVENTION

For the liquid chromatograph according to Japanese Patent Laying-Open No. 2018-169350, however, cleaning of the autosampler while the autosampler is being used in a certain measurement block is not taken into consideration, and use of the autosampler has not been efficient.

The present invention was made to solve such a problem, and an object thereof is to provide a chromatograph in which a sample injection apparatus can efficiently be used, and a sample injection apparatus.

A first aspect of the present invention is directed to a sample injection apparatus that injects a sample into a mobile phase that flows through an analysis flow path that extends from a high-pressure pump to a column in a chromatograph. The analysis flow path includes an upstream analysis flow path on a side of the high-pressure pump and a downstream analysis flow path on a side of the column. The sample injection apparatus includes a retention flow path that includes a needle at a downstream end and holds the sample suctioned from a sample container through the needle, an injection flow path that includes an injection port at an upstream end and serves to inject into the analysis flow path, the sample injected from the needle into the injection port, a low-pressure flow path having an upstream end connected to a measuring pump and a cleaning pump, and a state switch valve that switches between a first state and a second state, the first state being a state in which the upstream analysis flow path and the downstream analysis flow path are connected to each other and a downstream end of the low-pressure flow path and an upstream end of the retention flow path are connected to each other, the second state being a state in which the upstream analysis flow path and the upstream end of the retention flow path are connected to each other and a downstream end of the injection flow path and the downstream analysis flow path are connected to each other.

A second aspect of the present invention is directed to a chromatograph that includes the sample injection apparatus described above.

The foregoing and other objects, features, aspects and advantages of the present invention will become more apparent from the following detailed description of the present invention when taken in conjunction with the accompanying drawings.

DETAILED DESCRIPTION

Figure 1:
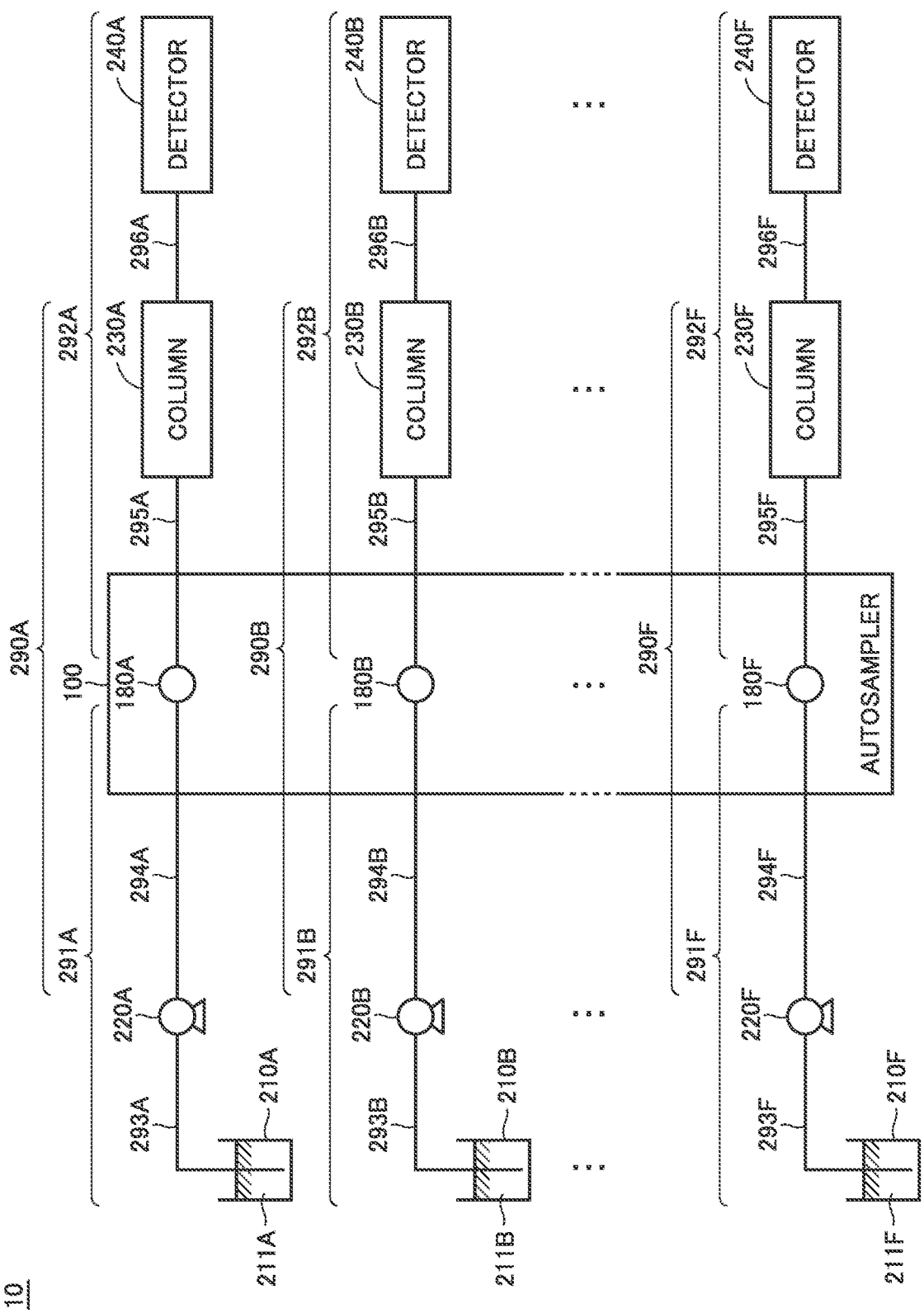
FIG. 1 is a diagram of a schematic configuration of a liquid chromatograph according to the present embodiment.

An embodiment of the present disclosure will be described in detail below with reference to the drawings. The same or corresponding elements in the drawings have the same reference characters allotted and description thereof will not be repeated.

FIG. 1 is a diagram of a schematic configuration of a liquid chromatograph 10 according to the present embodiment. Referring to FIG. 1, liquid chromatograph 10 is an analysis apparatus used for chromatographic analysis in which a sample to be analyzed is introduced into columns 230A to 230F together with a mobile phase and a component contained in the sample is separated, a liquid being adopted as the mobile phase. Liquid chromatograph 10 in the present embodiment includes a prescribed number of (six in the present embodiment) analysis flow paths 290A to 290F.

Analysis flow paths 290A to 290F are constituted of upstream analysis flow paths 291A to 291F and downstream analysis flow paths 292A to 292F, respectively. High-pressure valves 180A to 180F of an autosampler 100 are provided between upstream analysis flow paths 291A to 291F and downstream analysis flow paths 292A to 292F, respectively. Autosampler 100 is an apparatus that injects a liquid sample into a mobile phase in analysis flow paths 290A to 290F of liquid chromatograph 10.

Upstream analysis flow paths 291A to 291F include mobile phase containers 210A to 210F and high-pressure pumps 220A to 220F, respectively. Mobile phase containers 210A to 210F are connected to high-pressure pumps 220A to 220F through flow paths 293A to 293F, respectively. High-pressure pumps 220A to 220F are connected to high-pressure valves 180A to 180F through flow paths 294A to 294F, respectively.

Mobile phase containers 210A to 210F are filled with eluants 211A to 211F as the mobile phase to be fed to analysis flow paths 290A to 290F, respectively. Eluants 211A to 211F should only be a liquid usable as the mobile phase for analysis by the liquid chromatograph and the eluants may be identical to or different from one another.

High-pressure pumps 220A to 220F suck up eluants 211A to 211F from mobile phase containers 210A to 210F and deliver sucked-up eluants 211A to 211F to terminal ends of analysis flow paths 290A to 290F, respectively.

Downstream analysis flow paths 292A to 292F include columns 230A to 230F and detectors 240A to 240F, respectively. High-pressure valves 180A to 180F are connected to columns 230A to 230F through flow paths 295A to 295F, respectively. Columns 230A to 230F are connected to detectors 240A to 240F through flow paths 296A to 296F, respectively.

Columns 230A to 230F are filled with fixed phases for separating a component of a sample injected into eluants 211A to 211F in analysis flow paths 290A to 290F by autosampler 100. The fixed phases with which columns 230A to 230F are filled should only be usable as a fixed phase in analysis by the liquid chromatograph, and the fixed phases may be identical to or different from one another.

Detectors 240A to 240F are each an apparatus that analyzes a sample contained in eluants 211A to 211F and separated in columns 230A to 230F, and they are, for example, a mass spectrometer, an absorbency detector, a PDA detector, a fluorescence detector, a differential refractometer, a conductivity detector, an evaporative light scattering detector, an electrochemical detector, an infrared spectrophotometer, an optical rotation detector, a circular dichroism detector, a flame ionization detector, a radiation detector, a dielectric constant detector, a chemiluminescence detector, an atomic absorption spectrophotometer, an inductive coupling plasma optical emission spectrometer, a high-frequency plasma mass spectrometer, a heat detector, an optical scattering detector, a viscosity detector, an ion electrode, an ultrasonic detector, or a nuclear magnetic resonance apparatus.

Figure 2:
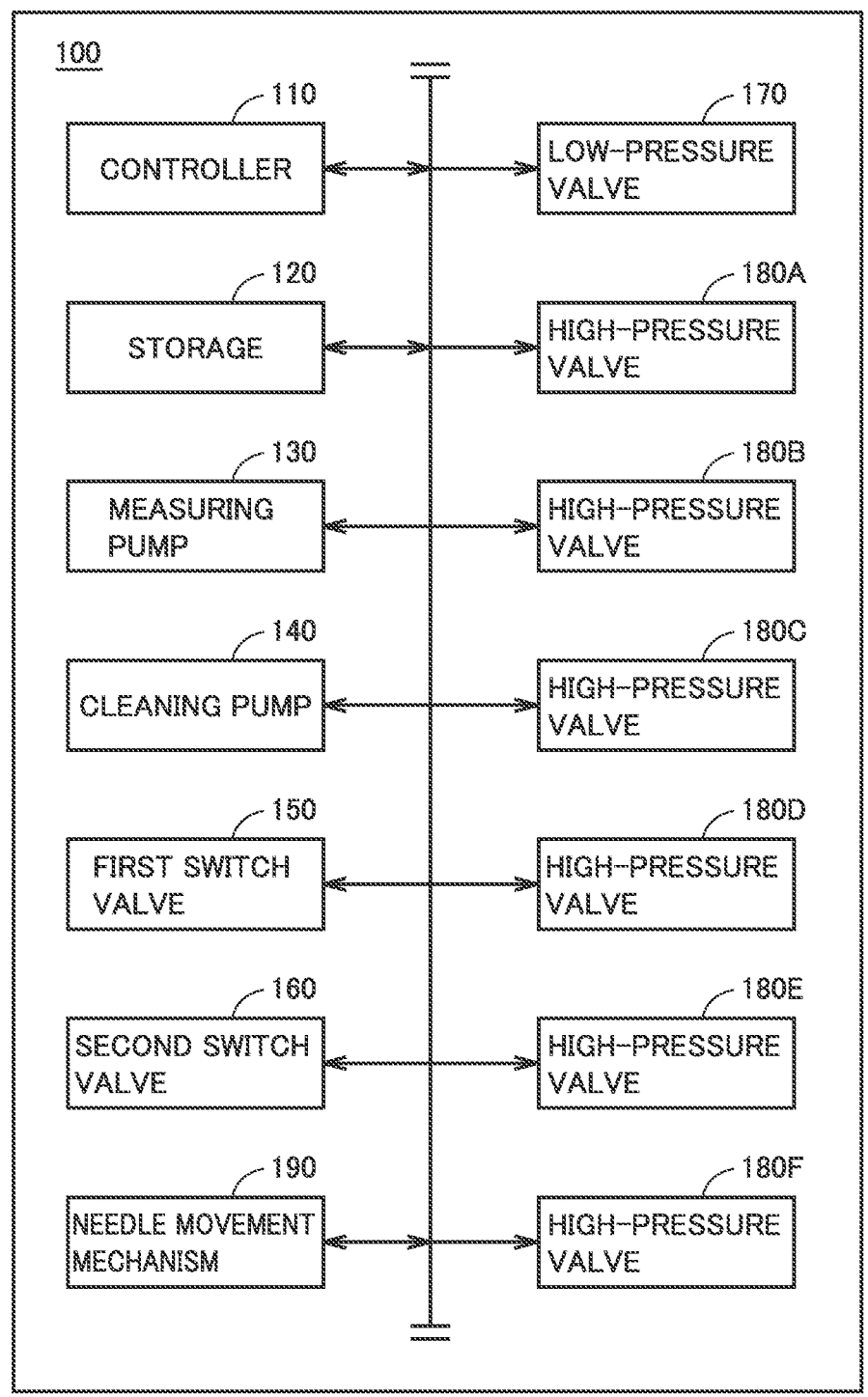
FIG. 2 is a diagram of a schematic configuration of an autosampler according to the present embodiment.

FIG. 2 is a diagram of a schematic configuration of autosampler 100 according to the present embodiment. Autosampler 100 includes as its main components, a controller 110, a storage 120, a measuring pump 130, a cleaning pump 140, a first switch valve 150, a second switch valve 160, a low-pressure valve 170, high-pressure valves 180A to 180F, and a needle movement mechanism 190. Measuring pump 130, cleaning pump 140, first switch valve 150, second switch valve 160, low-pressure valve 170, and high-pressure valves 180A to 180F are connected to one another through flow paths as shown in FIG. 1 described previously and FIG. 4 or following figures which will be described later.

Controller 110 includes, for example, a central processing unit (CPU), and controls each component (measuring pump 130, cleaning pump 140, first switch valve 150, second switch valve 160, low-pressure valve 170, high-pressure valves 180A to 180F, and needle movement mechanism 190) of autosampler 100 described above. Storage 120 stores a control program executed by the CPU of controller 110 and data input and output in accordance with the control program.

Though not shown in FIG. 2, autosampler 100 may include an input unit to which an instruction to autosampler 100 is input by a user, an output unit from which information from autosampler 100 is output, and a communication unit for autosampler 100 to communicate with another apparatus.

Alternatively, autosampler 100 may include no controller 110 and no storage 120, and a controller and a storage of liquid chromatograph 10 may function as controller 110 and storage 120 of autosampler 100.

Measuring pump 130 is used for suctioning an indicated amount of sample, and it is, for example, a pump including a syringe as a suction mechanism. Cleaning pump 140 is used for delivering a cleaning solution for cleaning a flow path to each flow path. In the present embodiment, the cleaning solution is a liquid identical to the eluant as the mobile phase. First switch valve 150 and second switch valve 160 are each a multi-way switch valve, and used for switching among a prescribed number of analysis flow paths 290A to 290F into which a sample is injected by autosampler 100. Functions of measuring pump 130, cleaning pump 140, first switch valve 150, second switch valve 160, low-pressure valve 170, high-pressure valves 180A to 180F, and needle movement mechanism 190 will be described with reference to FIG. 3 or following figures which will be described later.

Though FIG. 2 shows that controller 110 appears to directly be connected to a device to be controlled (measuring pump 130, cleaning pump 140, first switch valve 150, second switch valve 160, low-pressure valve 170, high-pressure valves 180A to 180F, and needle movement mechanism 190) for the sake of convenience, they are not actually directly connected to each other, and may be connected, for example, with a relay or a sequencer being interposed.

Figure 3:
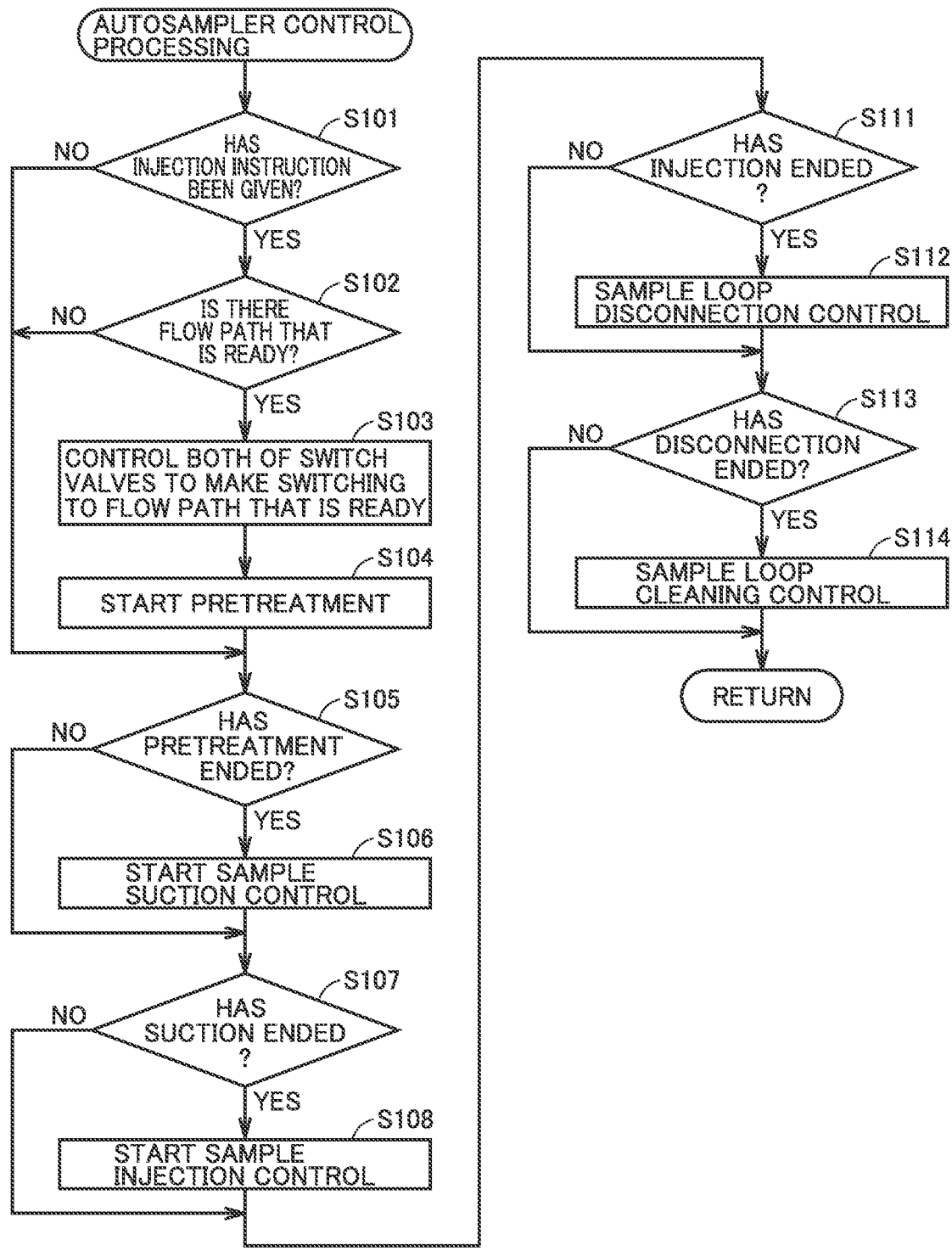
FIG. 3 is a flowchart showing a flow of autosampler control processing in the present embodiment.

FIG. 3 is a flowchart showing a flow of processing in the present embodiment. The autosampler control processing is performed as being invoked periodically (for example, every prescribed cycle) from a higher-order process by controller 110.

Referring to FIG. 3, controller 110 determines whether or not an instruction to inject a sample has been given from a user or an external apparatus (for example, liquid chromatograph 10) (step S101). When controller 110 determines that the instruction to inject the sample has been given (YES in step S101), controller 110 determines whether or not there is a flow path that is ready for receiving injection of a sample thereinto (step S102).

When controller 110 determines that there is a flow path that is ready (YES in step S102), controller 110 controls first switch valve 150 and second switch valve 160 to make switching to the flow path that is ready (step S103).

Figure 4:
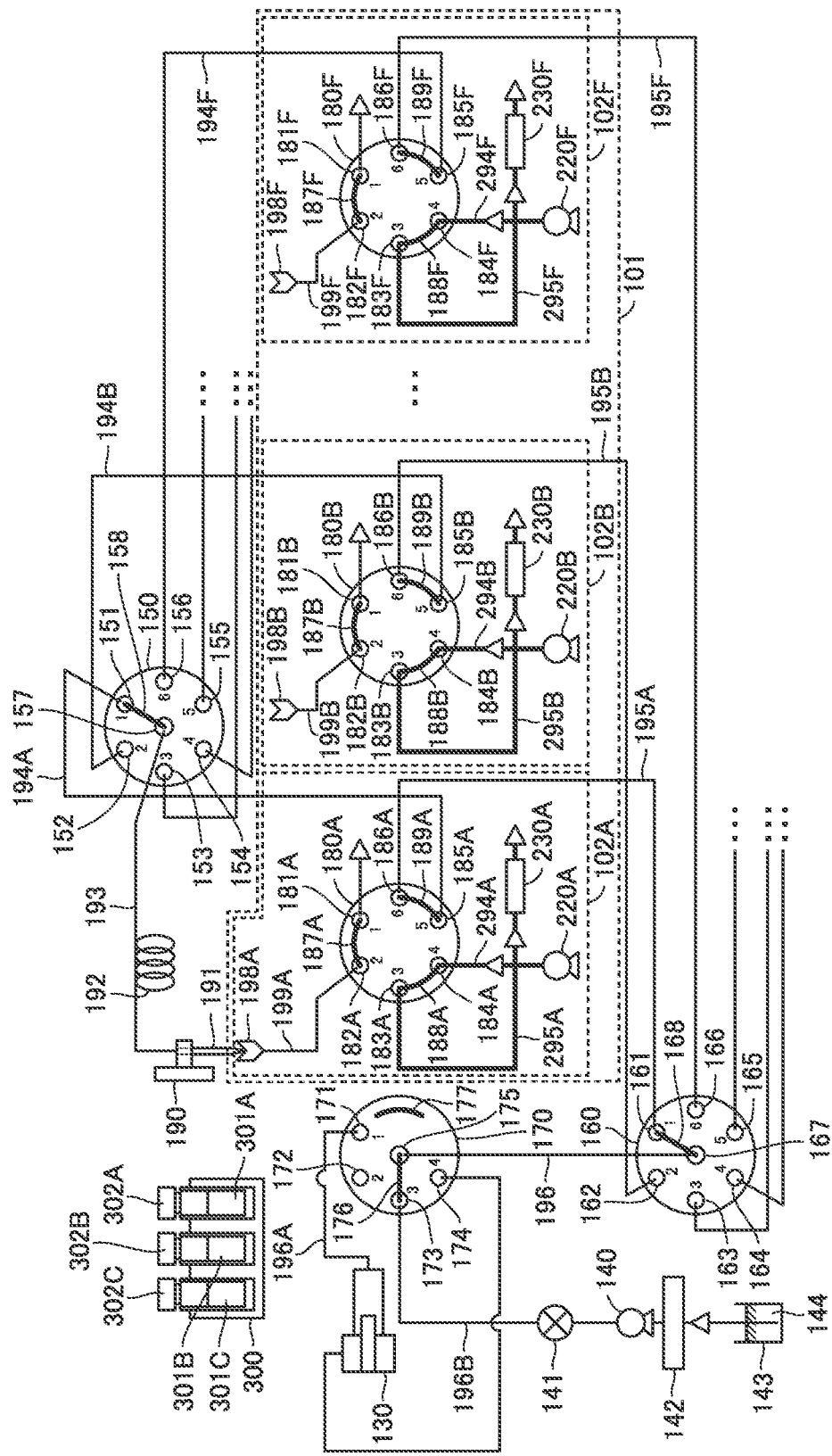
FIG. 4 is a first diagram showing an exemplary flow of control of a flow path in the autosampler in the present embodiment.

FIG. 4 is a first diagram showing an exemplary flow of control of a flow path in autosampler 100 in the present embodiment. FIG. 4 shows a state that first switch valve 150 and second switch valve 160 have made switching to flow paths connected to first ports 151 and 161, respectively. Portions switched by first switch valve 150 and second switch valve 160 are thus referred to as switch units 102A to 102F. In the present embodiment, autosampler 100 includes above-described prescribed number of switch units 102A to 102F. A portion constituted of the prescribed number of switch units 102A to 102F is referred to as a switch apparatus 101.

A flow path in autosampler 100 will initially be described. A retention flow path is a flow path for holding a sample suctioned from any of sample containers 302A to 302C through a needle 191. Needle 191 is a component like a syringe needle to be inserted into sample containers 302A to 302C for suctioning a sample, and inserted into injection ports 198A to 198F which will be described later for injecting the sample. Sample containers 302A to 302C containing samples 301A to 301C are placed on a sample base 300.

The retention flow path is made up of a combination of a downstream retention flow path 193 and upstream retention flow paths 194A to 194F. Downstream retention flow path 193 includes needle 191 at a downstream end and has an upstream end connected to a port 157 at the center of first switch valve 150. Upstream retention flow paths 194A to 194F have respective upstream ends connected to first port 151 to a sixth port 156 of first switch valve 150 and have respective downstream ends connected to fifth ports 185A to 185F of high-pressure valves 180A to 180F.

A sample loop 192 that allows needle 191 at the tip end of downstream retention flow path 193 to freely move by extension and contraction and to secure a volume for holding a sample is provided in a midway along downstream retention flow path 193. Needle movement mechanism 190 is connected to needle 191, and allows needle 191 to move in each of directions of three axes orthogonal to one another under the control by controller 110.

Injection flow paths 199A to 199F include injection ports 198A to 198F at respective upstream ends, and they are flow paths for injecting a sample injected from needle 191 into injection ports 198A to 198F, into a portion downstream from flow paths 295A to 295F of analysis flow paths 290A to 290F shown in FIG. 1. Injection ports 198A to 198F are components where needle 191 is inserted and the injected sample is received.

Flow paths 295A to 295F of analysis flow paths 290A to 290F have respective upstream ends connected to third ports 183A to 183F of high-pressure valves 180A to 180F and have respective downstream ends connected to columns 230A to 230F. Flow paths 294A to 294F of analysis flow paths 290A to 290F have respective downstream ends connected to fourth ports 184A to 184F of high-pressure valves 180A to 180F and have respective upstream ends connected to high-pressure pumps 220A to 220F.

The low-pressure flow path has its upstream end connected to measuring pump 130 and cleaning pump 140. The low-pressure flow path is made up of a combination of an upstream low-pressure flow path 196 and downstream low-pressure flow paths 195A to 195F. Upstream low-pressure flow path 196 has its upstream end connected to measuring pump 130 and cleaning pump 140 and has its downstream end connected to a port 167 at the center of second switch valve 160. Downstream low-pressure flow paths 195A to 195F have respective upstream ends connected to first port 161 to sixth port 166 of second switch valve 160 and have respective downstream ends connected to sixth ports 186A to 186F of high-pressure valves 180A to 180F.

Low-pressure valve 170 switches a pump to be connected to the upstream end of upstream low-pressure flow path 196 to measuring pump 130 or cleaning pump 140. Upstream low-pressure flow path 196 has its downstream-side upstream end connected to a port 175 at the center of low-pressure valve 170 and has its downstream end connected to port 167 at the center of second switch valve 160. A downstream end of an upstream low-pressure flow path 196A having its upstream end connected to measuring pump 130 on an upstream side of upstream low-pressure flow path 196 is connected to a first port 171 of low-pressure valve 170. A downstream end of an upstream low-pressure flow path 196B having its upstream end connected to cleaning pump 140 on the upstream side of upstream low-pressure flow path 196 is connected to a third port 173 of low-pressure valve 170. In a flow path between cleaning pump 140 and third port 173 of low-pressure valve 170, a valve 141 for opening and closing this flow path is provided.

When measuring pump 130 is controlled by controller 110 to suction a sample, a pressure applied by measuring pump 130 for suctioning the sample is transmitted to needle 191 through upstream low-pressure flow path 196, downstream low-pressure flow paths 195A to 195F, upstream retention flow paths 194A to 194F, and downstream retention flow path 193. The sample is thus suctioned from needle 191 to downstream retention flow path 193.

When cleaning pump 140 is controlled by controller 110 to suction a cleaning solution 144 in a cleaning solution container 143, cleaning solution 144 is suctioned by the pressure generated by cleaning pump 140 from cleaning solution container 143 through a degassing unit (DGU) 142 and delivered through valve 141, upstream low-pressure flow paths 196B and 196, downstream low-pressure flow paths 195A to 195F, and upstream retention flow paths 194A to 194F to downstream retention flow path 193, needle 191, and injection flow paths 199A to 199F. DGU 142 removes air bubbles contained in cleaning solution 144.

First switch unit 102A of switch apparatus 101 of autosampler 100 in the present embodiment is made up of a combination of upstream retention flow path 194A, injection flow path 199A, high-pressure valve 180A, and downstream low-pressure flow path 195A, and similarly, second switch unit 102B to sixth switch unit 102F are made up of combinations of upstream retention flow paths 194B to 194F, injection flow paths 199B to 199F, high-pressure valves 180B to 180F, and downstream low-pressure flow paths 195B to 195F, respectively.

High-pressure valves 180A to 180F are each controlled by controller 110 to make switching to a first state or a second state. The first state refers to a state that connection portions 187A to 187F connect first ports 181A to 181F to second ports 182A to 182F, respectively, connection portions 188A to 188F connect third ports 183A to 183F to fourth ports 184A to 184F, respectively, and connection portions 189A to 189F connect fifth ports 185A to 185F to sixth ports 186A to 186F, respectively. In other words, the first state refers to a state that high-pressure valves 180A to 180F connect the downstream ends of flow paths 294A to 294F of upstream analysis flow paths 291A to 291F connected to fourth ports 184A to 184F to the upstream ends of flow paths 295A to 295F of downstream analysis flow paths 292A to 292F connected to third ports 183A to 183F, respectively, and connect the downstream ends of downstream low-pressure flow paths 195A to 195F of the low-pressure flow path connected to sixth ports 186A to 186F to the upstream ends of upstream retention flow paths 194A to 194F of the retention flow path connected to fifth ports 185A to 185F, respectively.

The second state refers to a state resulting from counter-clockwise rotation of connection portions 187A to 187F, 188A to 188F, and 189A to 189F from the first state, that is, a state that connection portions 187A to 187F connect second ports 182A to 182F to third ports 183A to 183F, respectively, connection portions 188A to 188F connect fourth ports 184A to 184F to fifth ports 185A to 185F, respectively, and connection portions 189A to 189F connect sixth ports 186A to 186F to first ports 181A to 181F, respectively. In other words, the second state refers to a state that high-pressure valves 180A to 180F connect the downstream ends of flow paths 294A to 294F of upstream analysis flow paths 291A to 291F connected to fourth ports 184A to 184F to the upstream ends of upstream retention flow paths 194A to 194F of the retention flow path connected to fifth ports 185A to 185F, respectively, and connect the downstream ends of injection flow paths 199A to 199F connected to second ports 182A to 182F to the upstream ends of flow paths 295A to 295F of downstream analysis flow paths 292A to 292F connected to third ports 183A to 183F, respectively.

Referring back to FIG. 3, in step S103, as shown in FIG. 4, first switch valve 150 and second switch valve 160 switch to first ports 151 and 161, respectively, so that switching to the flow path in first switch unit 102A on the leftmost side, among switch units 102A to 102F of switch apparatus 101 of autosampler 100 is made. High-pressure valve 180A of first switch unit 102A has been switched to the first state. Then, controller 110 starts pretreatment (step S104).

Figure 5:
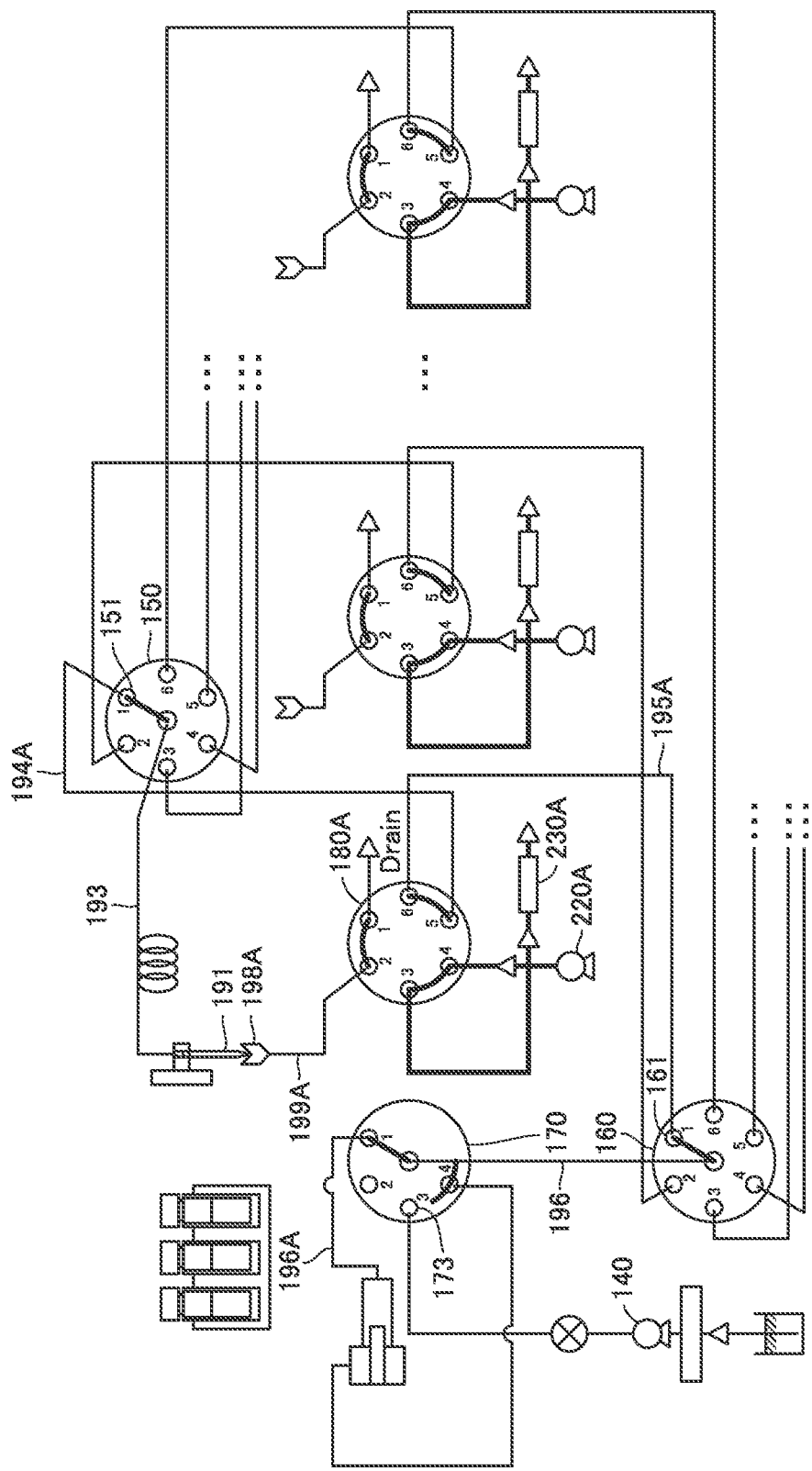
FIG. 5 is a second diagram showing an exemplary flow of control of the flow path in the autosampler in the present embodiment.

FIG. 5 is a second diagram showing an exemplary flow of control of the flow path in autosampler 100 in the present embodiment. Referring to FIG. 5, in pretreatment, when needle 191 is not inserted in injection port 198A, and injection flow path 199A, downstream retention flow path 193, upstream retention flow path 194A, downstream low-pressure flow path 195A, and upstream low-pressure flow paths 196 and 196A are not filled with a cleaning solution identical to the mobile phase, for setting a state as such, controller 110 makes portion 176 of connection to port 175 at the center of low-pressure valve 170 to switch to third port 173 and controls cleaning pump 140 to deliver the cleaning solution to these flow paths.

When pretreatment ends, a state that high-pressure pump 220A is delivering eluant 211A representing the mobile phase to column 230A and the mobile phase is in equilibrium in column 230A is set. Though the controller of liquid chromatograph 10 controls high-pressure pump 220A in the present embodiment, controller 110 of autosampler 100 may control high-pressure pump 220A.

When it is determined that the current time is not timing of issuance of an instruction to inject a sample (NO in step S101), when it is determined that there is no flow path that is ready for receiving injection of a sample (NO in step S102), or after step S104, controller 110 determines whether or not pretreatment has ended (step S105). When it is determined that pretreatment has ended (YES in step S105), controller 110 starts sample suction control (step S106).

Figure 6:
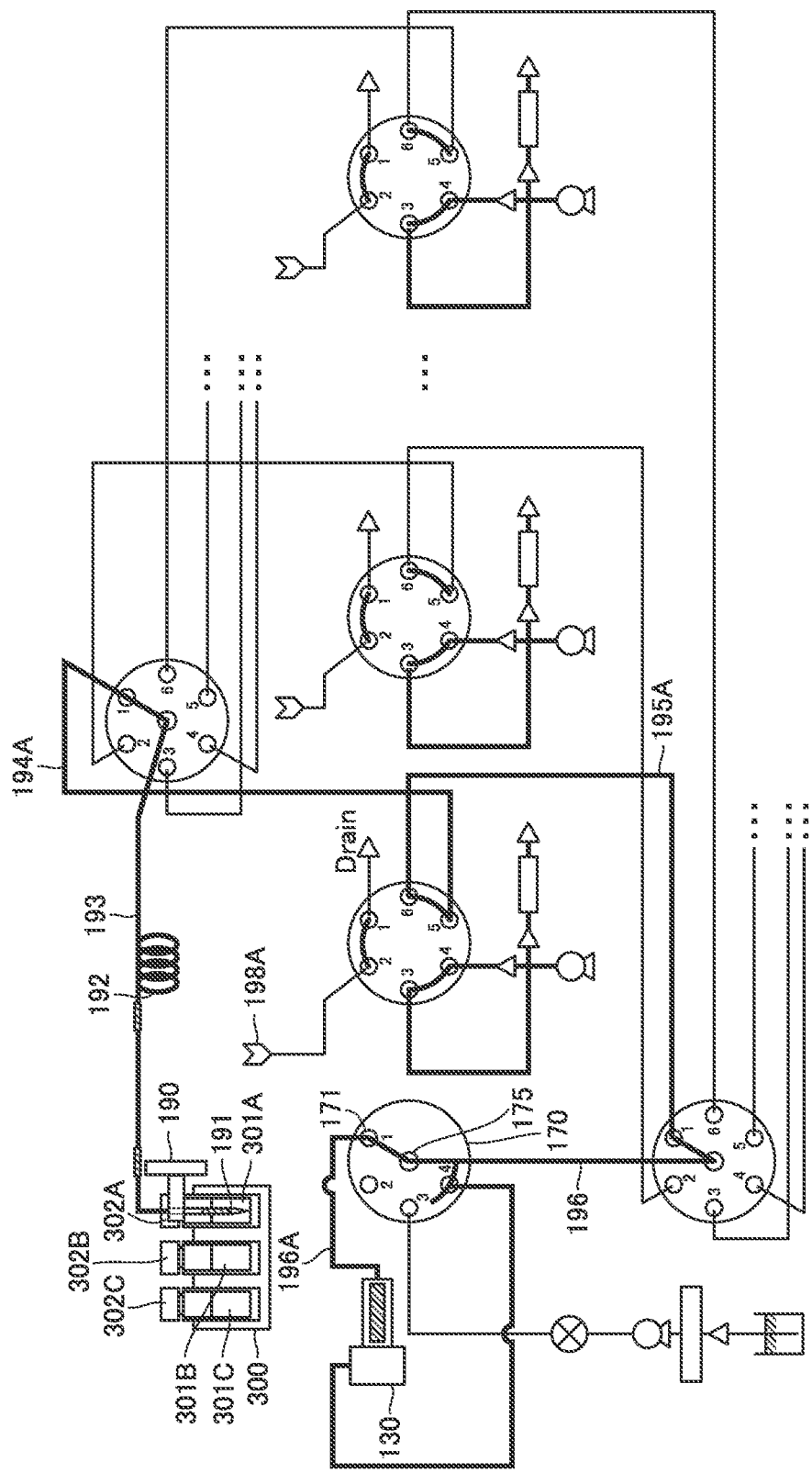
FIG. 6 is a third diagram showing an exemplary flow of control of the flow path in the autosampler in the present embodiment.

FIG. 6 is a third diagram showing an exemplary flow of control of the flow path in autosampler 100 in the present embodiment. Referring to FIG. 6, in sample suction control, initially, needle movement mechanism 190 is controlled by controller 110 to move needle 191 from injection port 198A to insert the needle into a designated sample container among sample containers 302A to 302C. Then, under the control by controller 110, portion 176 of connection to port 175 at the center of low-pressure valve 170 is switched to first port 171 to which measuring pump 130 is connected.

Then, controller 110 controls measuring pump 130 to perform an operation to suction a designated amount of sample so that a suction pressure is transmitted to needle 191 through upstream low-pressure flow paths 196A and 196, downstream low-pressure flow path 195A, upstream retention flow path 194A, and downstream retention flow path 193. The designated amount of sample 301A in designated sample container 302A is thus suctioned from needle 191 to downstream retention flow path 193.

Though the inside of measuring pump 130 is hatched in FIG. 6, the hatching does not mean that sample 301A has reached measuring pump 130 as a result of suction but means that a pressure is simply applied. Actually, sample 301A is suctioned to a portion around sample loop 192.

Referring back to FIG. 3, when it is determined that the current time is not timing of end of pretreatment (NO in step S105) or after step S106, controller 110 determines whether or not sample suction control has ended (step S107). When it is determined that sample suction control has ended (YES in step S107), controller 110 starts sample injection control (step S108).

Figure 7:
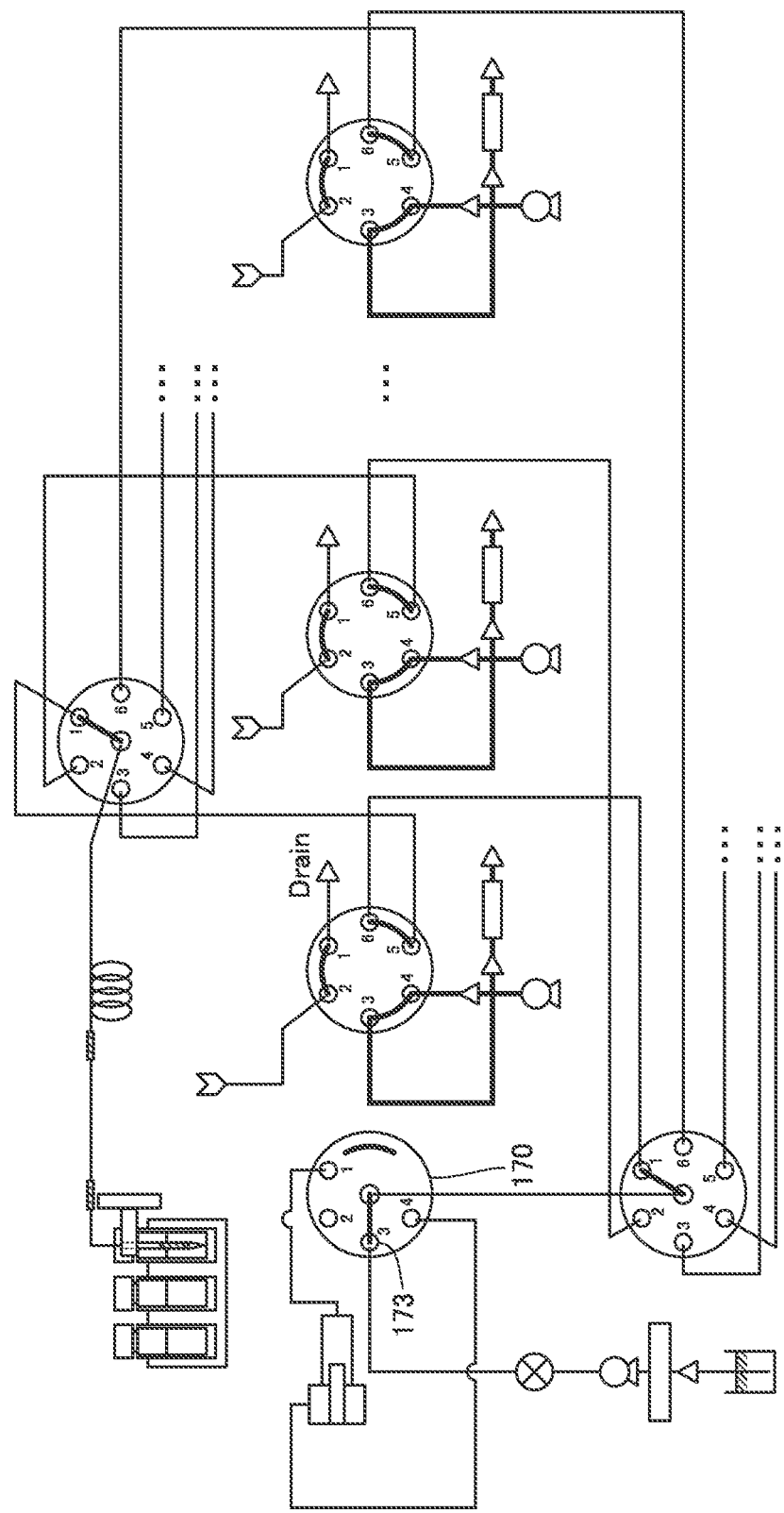
FIG. 7 is a fourth diagram showing an exemplary flow of control of the flow path in the autosampler in the present embodiment.

FIG. 7 is a fourth diagram showing an exemplary flow of control of the flow path in autosampler 100 in the present embodiment. Referring to FIG. 7, in sample injection control, initially, under the control by controller 110, portion 176 of connection to port 175 at the center of low-pressure valve 170 is switched to third port 173.

Figure 8:
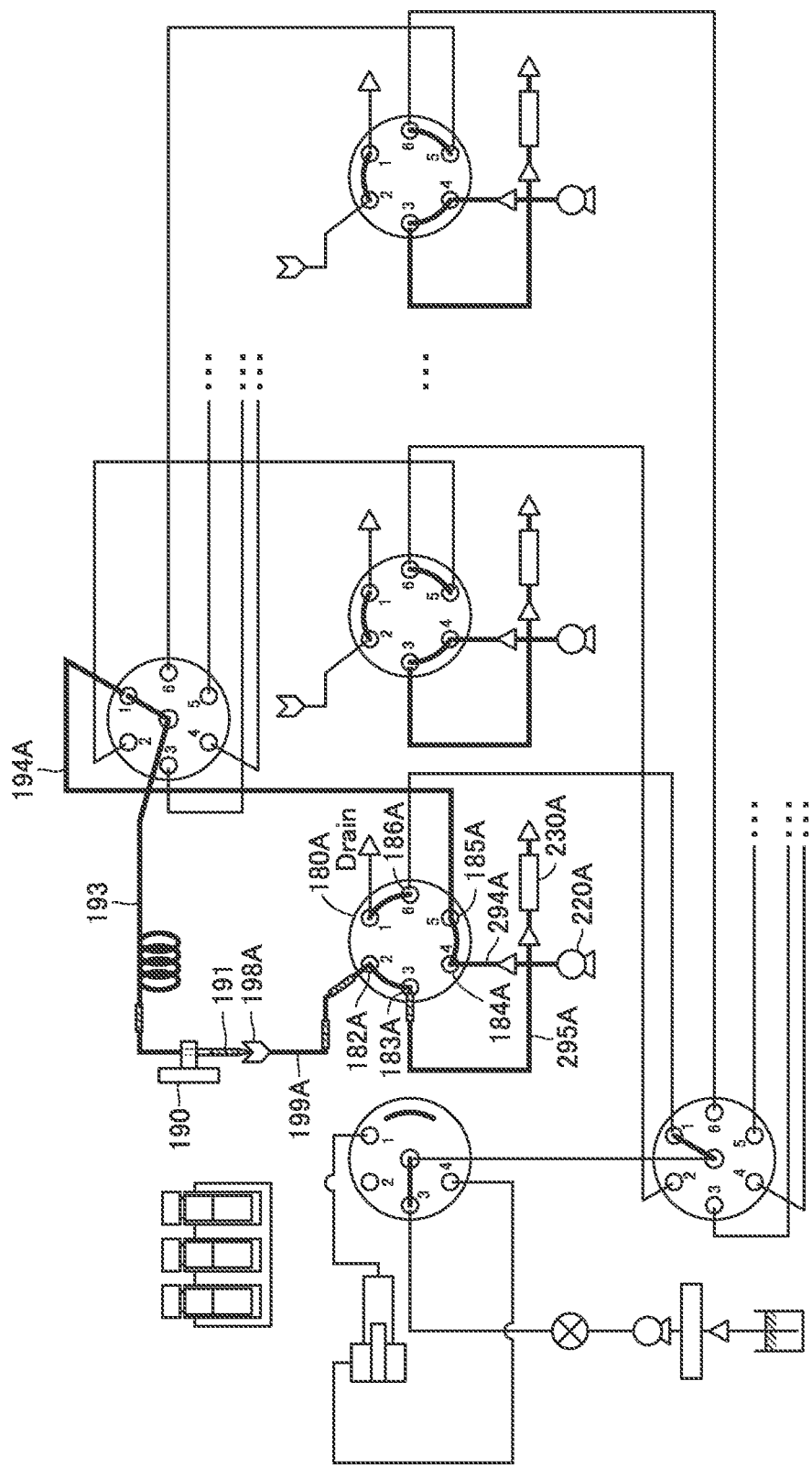
FIG. 8 is a fifth diagram showing an exemplary flow of control of the flow path in the autosampler in the present embodiment.

FIG. 8 is a fifth diagram showing an exemplary flow of control of the flow path in autosampler 100 in the present embodiment. Referring to FIG. 8, in sample injection control, then, under the control by controller 110, high-pressure valve 180A is switched to the second state. Flow path 294A of upstream analysis flow path 291A is thus connected to upstream retention flow path 194A and injection flow path 199A is connected to flow path 295A of downstream analysis flow path 292A.

Therefore, the sample suctioned into downstream retention flow path 193 is delivered to column 230A through flow path 295A of downstream analysis flow path 292A via needle 191, injection port 198A, and injection flow path 199A, under the pressure applied by high-pressure pump 220A. Consequently, the sample is separated in column 230A and analysis in detector 240F is started.

Referring back to FIG. 3, when it is determined that the current time is not timing of end of sample injection control (NO in step S107) or after step S108, controller 110 determines whether or not sample injection control has ended (step S111). When it is determined that sample injection control has ended (YES in step S111), controller 110 starts sample loop disconnection control (step S112). Though the sample loop is made up of upstream retention flow paths 194A to 194F, downstream retention flow path 193, and injection flow paths 199A to 199F, a portion where the sample is actually held is downstream retention flow path 193 and injection flow paths 199A to 199F.

Figure 9:
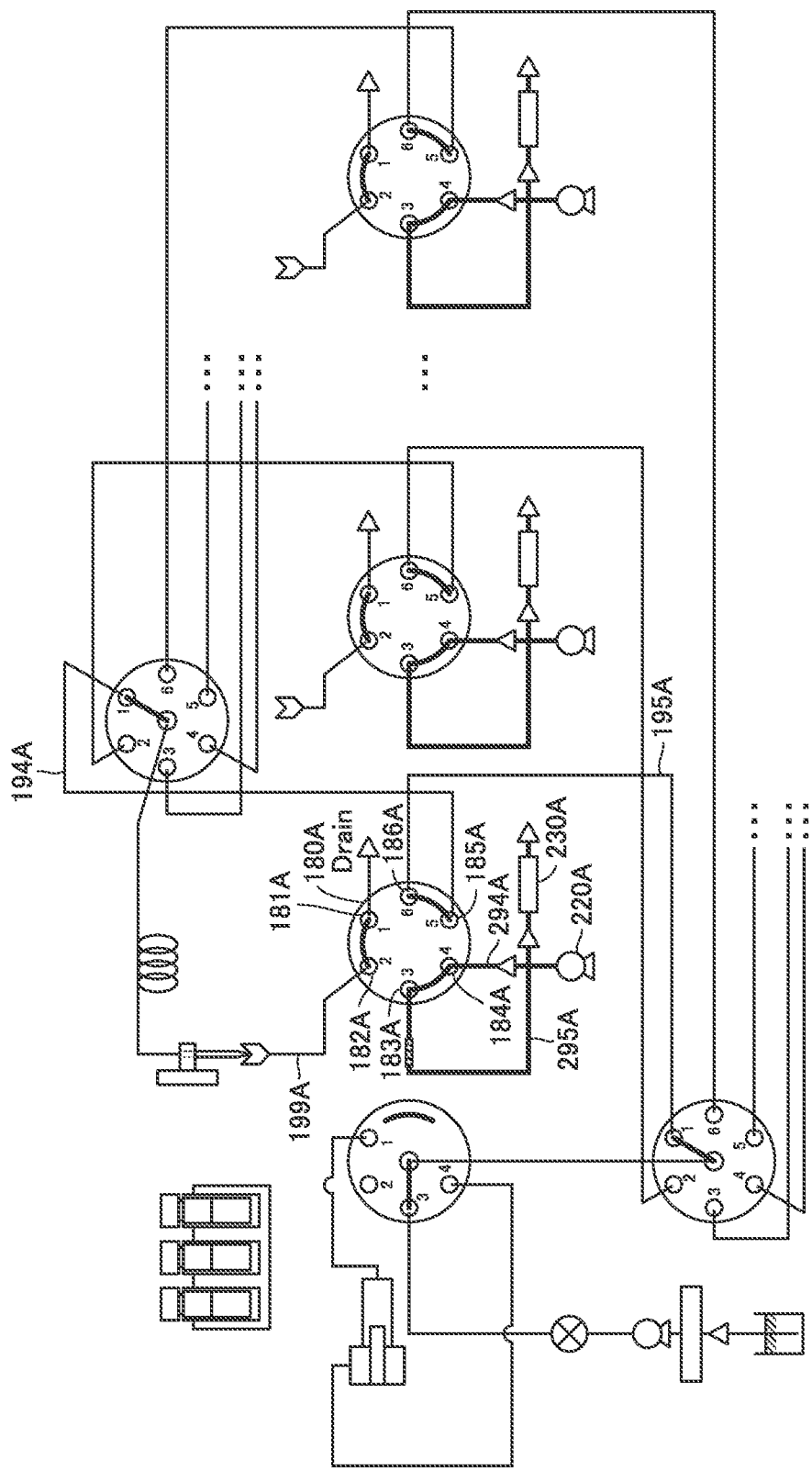
FIG. 9 is a sixth diagram showing an exemplary flow of control of the flow path in the autosampler in the present embodiment.

FIG. 9 is a sixth diagram showing an exemplary flow of control of the flow path in autosampler 100 in the present embodiment. Referring to FIG. 9, in sample loop disconnection control, initially, under the control by controller 110, high-pressure valve 180A is switched to the first state. Upstream retention flow path 194A is thus disconnected from flow path 294A of upstream analysis flow path 291A and connected to downstream low-pressure flow path 195A, and injection flow path 199A is disconnected from flow path 295A of downstream analysis flow path 292A and connected to a flow path for drainage. In other words, downstream retention flow path 193 that has held the sample and injection flow path 199A used for injection of the sample are disconnected from analysis flow path 290A. Consequently, while upstream analysis flow path 291A and downstream analysis flow path 292A are directly connected to each other, separation of the sample in column 230A and analysis of the sample in detector 240F are continued.

Referring back to FIG. 3, when it is determined that the current time is not timing of end of sample injection control (NO in step S111) or after step S112, controller 110 determines whether or not sample loop disconnection control has ended (step S113). When it is determined that sample loop disconnection control has ended (YES in step S113), controller 110 starts sample loop cleaning control (step S114).

Figure 10:
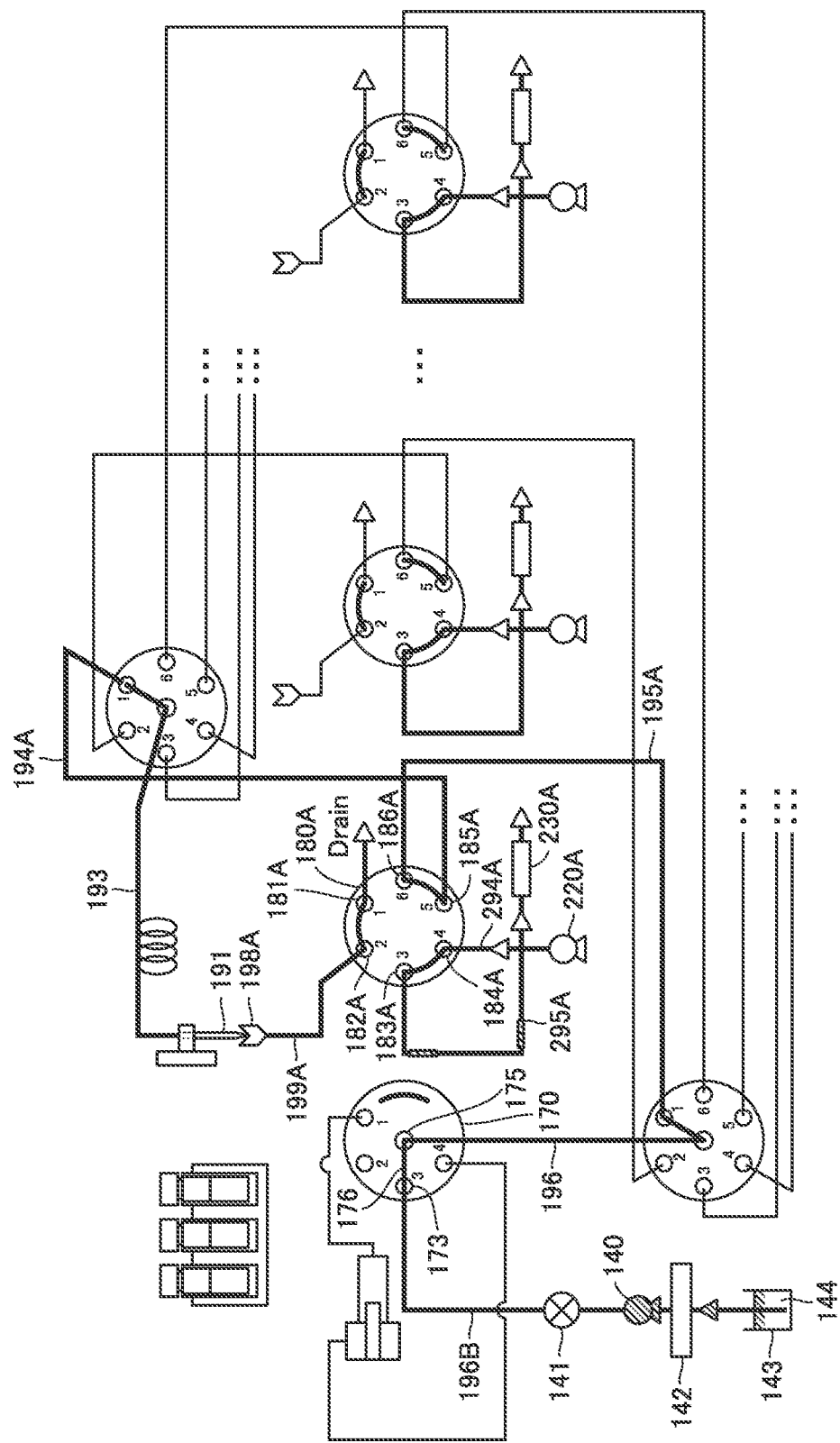
FIG. 10 is a seventh diagram showing an exemplary flow of control of the flow path in the autosampler in the present embodiment.

FIG. 10 is a seventh diagram showing an exemplary flow of control of the flow path in autosampler 100 in the present embodiment. Referring to FIG. 10, in sample loop cleaning control, initially, controller 110 controls cleaning pump 140 to suction cleaning solution 144 in cleaning solution container 143 so that the cleaning solution is delivered to the flow path for drainage through upstream low-pressure flow paths 196B and 196, downstream low-pressure flow path 195A, upstream retention flow path 194A, downstream retention flow path 193, needle 191, injection port 198A, and injection flow path 199A. The inside of downstream retention flow path 193 where the sample has been held, needle 191, injection port 198A, and injection flow path 199A is cleaned by the cleaning solution.

Referring back to FIG. 3, when it is determined that the current time is not timing of end of sample loop disconnection control (NO in step S113) or after step S114, controller 110 returns processing to be performed to the higher-order process from which the processing has been invoked.

Figure 11:
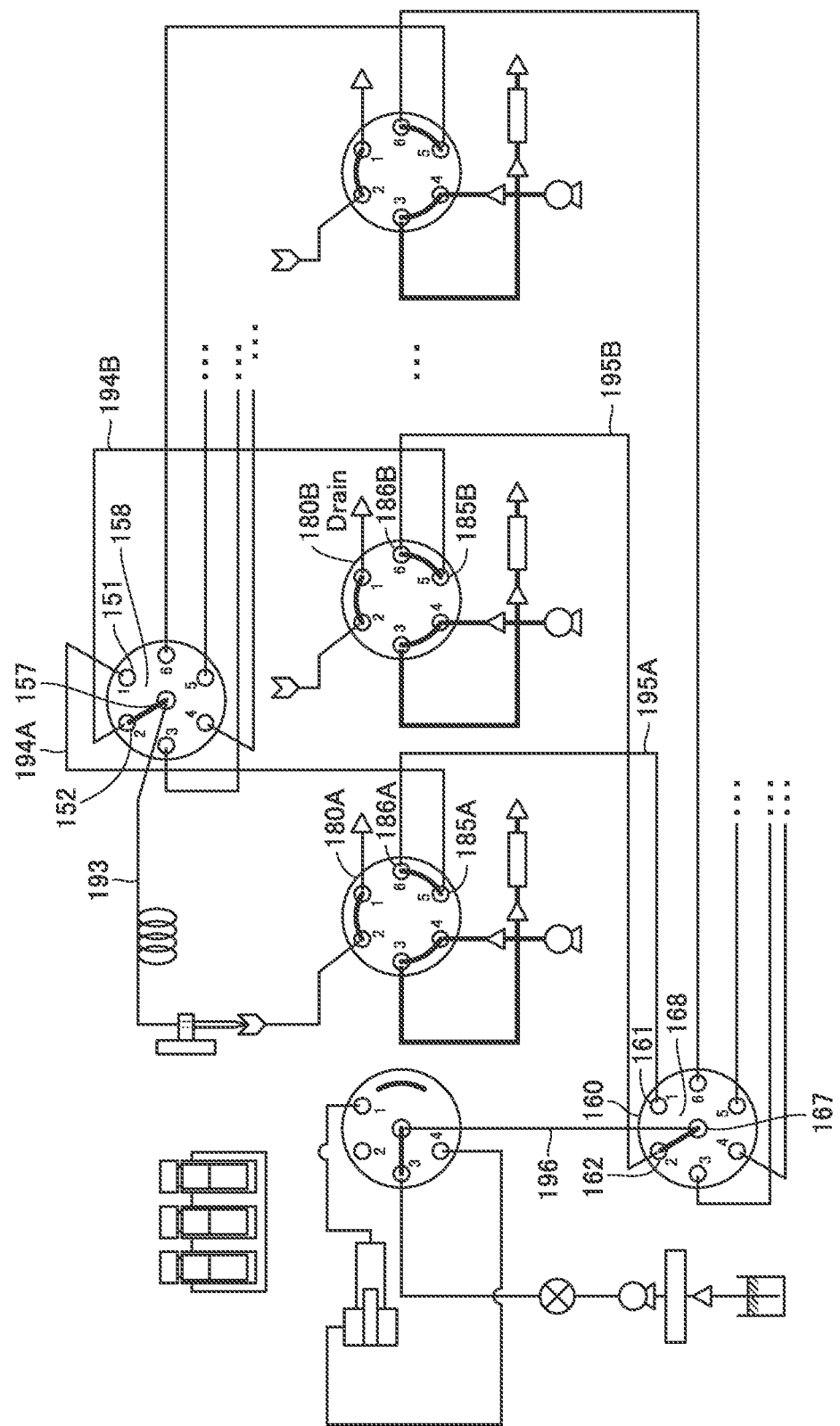
FIG. 11 is an eighth diagram showing an exemplary flow of control of the flow path in the autosampler in the present embodiment.

FIG. 11 is an eighth diagram showing an exemplary flow of control of the flow path in autosampler 100 in the present embodiment. Referring to FIG. 11, when it is determined in step S101 in FIG. 3 that a next injection instruction has been given and when it is determined in step S102 in FIG. 3 that the flow paths connected to respective second ports 152 and 162 of first switch valve 150 and second switch valve 160 are ready, first switch valve 150 and second switch valve 160 are controlled to make switching to the flow paths connected to second ports 152 and 162 in step S103 in FIG. 3. The downstream side of downstream retention flow path 193 and the upstream side of upstream low-pressure flow path 196 are connected to the flow paths connected to second ports 152 and 162, respectively.

[Modification]

(1) In the embodiment described previously, as shown in FIGS. 1 and 4, switching among six switch units 102A to 102F is made by first switch valve 150 and second switch valve 160. Without being limited thereto, a plurality of switch units rather than six switch units may be provided or a single switch unit may be provided.

(2) In the embodiment described previously, as shown in FIG. 4, a plurality of switch units 102A to 102F are provided and first switch valve 150 and second switch valve 160 are provided. Without being limited thereto, no first switch valve 150 and no second switch valve 160 may be provided, and only a single combination of upstream retention flow path 194A, injection flow path 199A, high-pressure valve 180A, and downstream low-pressure flow path 195A may be provided.

(3) In the embodiment described previously, as shown in FIG. 4, cleaning pump 140 is provided upstream from second switch valve 160 and low-pressure valve 170. Without being limited thereto, cleaning pump 140 may be provided in a portion where the sample in downstream retention flow path 193 normally does not reach.

[Aspects]

A person skilled in the art would understand that the plurality of exemplary embodiments described above represent specific examples of aspects below.

(Clause 1)

The sample injection apparatus according to one aspect is a sample injection apparatus that injects a sample into a mobile phase that flows through an analysis flow path that extends from a high-pressure pump to a column in a liquid chromatograph. The analysis flow path includes an upstream analysis flow path on a side of the high-pressure pump and a downstream analysis flow path on a side of the column. The sample injection apparatus includes a retention flow path that includes a needle at a downstream end and holds the sample suctioned from a sample container through the needle, an injection flow path that includes an injection port at an upstream end and serves to inject into the analysis flow path, the sample injected from the needle into the injection port, a low-pressure flow path having an upstream end connected to a measuring pump and a cleaning pump, and a state switch valve that switches between a first state and a second state, the first state being a state in which the upstream analysis flow path and the downstream analysis flow path are connected to each other and a downstream end of the low-pressure flow path and an upstream end of the retention flow path are connected to each other, the second state being a state in which the upstream analysis flow path and the upstream end of the retention flow path are connected to each other and a downstream end of the injection flow path and the downstream analysis flow path are connected to each other.

According to the sample injection apparatus described in Clause 1, while the sample injected into the downstream analysis flow path by the sample injection apparatus is delivered to the column immediately after injection of the sample into the analysis flow path, the cleaning solution can be delivered to the retention flow path and the injection flow path through the low-pressure flow path, so that a portion where the sample passed at the time of suction and injection can be cleaned. Consequently, the sample injection apparatus can efficiently be used.

A manner of injection in the present embodiment is total volume injection (which is also referred to as "direct injection"). In total volume injection, conventionally, the downstream retention flow path and the injection flow path are kept connected to the analysis flow path also after injection of the sample into the analysis flow path. Therefore, the needle could not be removed from the injection port. In the present embodiment, the downstream retention flow path and the injection flow path are disconnected from the analysis flow path by switching of the high-pressure valve after injection of the sample into the analysis flow path. Therefore, the needle can freely be moved, and when cleaning of the downstream retention flow path and the injection flow path has been completed, the needle can be moved for next injection of the sample into the analysis flow path.

In contrast to total volume injection, loop injection is available. In loop injection, a loop is provided between two ports of the high-pressure valve. The high-pressure valve is switched to allow injection of the sample into the loop and the sample is injected. Thereafter, the high-pressure valve is switched to connect the loop to the analysis flow path to deliver the sample to the analysis flow path. Since an extra amount of sample for filling the flow path as far as the loop should be suctioned in loop injection, the sample more than necessary is disadvantageously consumed. In addition, when the high-pressure valve is switched after injection of the sample into the loop, the sample is carried over and remains in the injection flow path as far as the loop. Furthermore, since the step of injecting the sample into the loop is required, it takes time to perform an injection operation. Total volume injection in the present embodiment is free from such problems, and analysis can be conducted only with an indicated amount of injection. Therefore, the step of injection into the loop can be reduced and a time period until analysis can be reduced. Thus, the number of flow paths that come in contact with the sample is reduced and carry-over can be suppressed.

(Clause 2)

In the sample injection apparatus described in Clause 1, the retention flow path includes an upstream retention flow path on a side of the state switch valve and a downstream retention flow path on a side of the needle. The low-pressure flow path includes an upstream low-pressure flow path on a side of the measuring pump and the cleaning pump and a downstream low-pressure flow path on a side of the state switch valve. The sample injection apparatus includes a switch apparatus that includes a prescribed number of switch units. The switch unit is made up of a combination of the upstream retention flow path, the injection flow path, the state switch valve, and the downstream low-pressure flow path. The sample injection apparatus further includes a first multi-way switch valve that is provided in a midway along the retention flow path and makes switching of the upstream retention flow path connected to the downstream retention flow path on a side of the downstream end of the retention flow path, among a prescribed number of upstream retention flow paths and a second multi-way switch valve that is provided in a midway along the low-pressure flow path and makes switching of the downstream low-pressure flow path connected to the upstream low-pressure flow path on a side of an upstream end of the low-pressure flow path, among a prescribed number of downstream low-pressure flow paths.

According to the sample injection apparatus described in Clause 2, while the sample injected into the downstream analysis flow path by the sample injection apparatus is delivered to the column immediately after injection of the sample into the analysis flow path, the cleaning solution can be delivered to the retention flow path and the injection flow path through the low-pressure flow path, so that a portion where the sample passed at the time of suction and injection can be cleaned. In addition, switching to another switch unit can also be made immediately after cleaning. Consequently, the sample injection apparatus can efficiently be used. Furthermore, even in total volume injection, the sample can be injected while switching among a plurality of switch units is made.

(Clause 3)

The sample injection apparatus described in Clause 2 further includes a controller that controls the state switch valve, the measuring pump, and the cleaning pump. The controller controls the state switch valve to make switching to the second state and controls the measuring pump to suction the sample from the sample container into the retention flow path while the needle is inserted in the sample container. The controller controls the state switch valve to make switching to the first state such that, after the sample is suctioned into the retention flow path, the suctioned sample flows from the retention flow path through the injection flow path to the downstream analysis flow path together with the mobile phase delivered by the high-pressure pump. The controller controls the state switch valve to make switching to the second state and controls the cleaning pump to deliver a cleaning solution to the retention flow path and the injection flow path through the low-pressure flow path while the sample injected into the downstream analysis flow path is delivered to the column.

According to the sample injection apparatus described in Clause 3, while the sample injected into the downstream analysis flow path by the sample injection apparatus is delivered to the column immediately after injection of the sample into the analysis flow path, the cleaning solution can be delivered to the retention flow path and the injection flow path through the low-pressure flow path, so that a portion where the sample passed at the time of suction and injection can be cleaned. Consequently, the sample injection apparatus can efficiently be used.

(Clause 4)

In the sample injection apparatus described in Clause 3, the controller controls the first multi-way switch valve and the second multi-way switch valve to make switching to the upstream retention flow path and the downstream low-pressure flow path included in the same switch unit. According to the sample injection apparatus described in Clause 4, switching among the switch units can appropriately be made.

(Clause 5)

In the sample injection apparatus described in Clause 4, the controller controls the first multi-way switch valve and the second multi-way switch valve to make switching after the cleaning solution flows to the retention flow path and the injection flow path while the sample injected into the downstream analysis flow path is delivered to the column.

According to the sample injection apparatus described in Clause 5, while the sample injected into the downstream analysis flow path by the sample injection apparatus is delivered to the column immediately after injection of the sample into the analysis flow path, the cleaning solution can be delivered to the retention flow path and the injection flow path through the low-pressure flow path, so that a portion where the sample passed at the time of suction and injection can be cleaned. In addition, switching to another switching unit can be made immediately after cleaning. Consequently, the sample injection apparatus can efficiently be used.

(Clause 6)

A liquid chromatograph according to another aspect includes the sample injection apparatus described in any of Clauses 1 to 5.

According to the liquid chromatograph described in Clause 6, while the sample injected into the downstream analysis flow path by the sample injection apparatus is delivered immediately after injection of the sample into the analysis flow path, the cleaning solution can be delivered to the retention flow path and the injection flow path through the low-pressure flow path, so that a portion where the sample passed at the time of suction and injection can be cleaned. Consequently, the sample injection apparatus can efficiently be used.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A chromatograph comprising:
    a sample injection apparatus that injects a sample into a mobile phase that flows through an analysis flow path that extends from a high-pressure pump to a column,
    the analysis flow path including an upstream analysis flow path comprising the high-pressure pump and a downstream analysis flow path comprising the column,
    the sample injection apparatus including
        a retention flow path that includes a needle at a downstream end and holds the sample suctioned from a sample container through the needle,
        an injection flow path that includes an injection port at an upstream end and serves to inject into the analysis flow path, the sample injected from the needle into the injection port,
        a low-pressure flow path having an upstream end connected to a measuring pump and a cleaning pump, and
        a state switch valve that switches between a first state and a second state, the first state being a state in which the upstream analysis flow path and the downstream analysis flow path are connected to each other and a downstream end of the low-pressure flow path and an upstream end of the retention flow path are connected to each other, the second state being a state in which the upstream analysis flow path and the upstream end of the retention flow path are connected to each other and a downstream end of the injection flow path and the downstream analysis flow path are connected to each other;

wherein:

the retention flow path includes an upstream retention flow path on a side of the state switch valve and a downstream retention flow path on a side of the needle, the low-pressure flow path includes an upstream low-pressure flow path on a side of the measuring pump and the cleaning pump and a downstream low-pressure flow path on a side of the state switch valve, the sample injection apparatus further includes:
- a switch apparatus that includes a plurality of switch units, each of the switch units being made up of a combination of the upstream retention flow path, the injection flow path, the state switch valve, and the downstream low-pressure flow path,
- a first multi-way switch valve that is provided in a midway along the retention flow path and makes switching of one of the upstream retention flow paths connected to the downstream retention flow path on a side of the downstream end of the retention flow path, and
- a second multi-way switch valve that is provided in a midway along the low-pressure flow path and makes switching of one of the downstream low-pressure flow paths connected to the upstream low-pressure flow path on a side of an upstream end of the low-pressure flow path.

2. The chromatograph according to claim 1, wherein the chromatograph comprises more than one analysis flow path, the sample injection apparatus is configured to inject a sample into a mobile phase in each analysis flow path, and the sample injection includes for each analysis flow path the retention flow path, the injection flow paths, the low-pressure flow path and the state switch valve.

3. The chromatograph according to claim 2, wherein for each analysis flow path:

the retention flow path includes an upstream retention flow path on a side of the state switch valve and a downstream retention flow path on a side of the needle, the low-pressure flow path includes an upstream low-pressure flow path on a side of the measuring pump and the cleaning pump and a downstream low-pressure flow path on a side of the state switch valve, and the sample injection further includes:
- a switch apparatus that includes a switch unit, the switch unit being made up of a combination of the upstream retention flow path, the injection flow path, the state switch valve, and the downstream low-pressure flow path,
- a first multi-way switch valve that is provided in a midway along the retention flow path and makes switching of the upstream retention flow path connected to the downstream retention flow path on a side of the downstream end of the retention flow path, and
- a second multi-way switch valve that is provided in a midway along the low-pressure flow path and makes switching of the downstream low-pressure flow path connected to the upstream low-pressure flow path on a side of an upstream end of the low-pressure flow path.

4. The chromatograph according to claim 3, further comprising a controller configured to control, for each analysis flow path, the state switch valve, the measuring pump, and the cleaning pump, wherein the controller is configured to control the state switch valve to make switching to the second state and is configured to control the measuring pump to suction the sample from the sample container into the retention flow path while the needle is inserted in the sample container, the controller is configured to control the state switch valve to make switching to the first state such that, after the sample is suctioned into the retention flow path, the suctioned sample flows from the retention flow path through the injection flow path to the downstream analysis flow path together with the mobile phase delivered by the high-pressure pump, and the controller is configured to control the state switch valve to make switching to the second state and is configured to control the cleaning pump to deliver a cleaning solution to the retention flow path and the injection flow path through the low-pressure flow path while the sample injected into the downstream analysis flow path is delivered to the column.

5. The chromatograph according to claim 4, wherein the controller is configured to control for each analysis flow path the first multi-way switch valve and the second multi-way switch valve to make switching to the upstream retention flow path and the downstream low-pressure flow path.

6. The chromatograph according to claim 5, wherein the controller is configured to control for each analysis flow path the first multi-way switch valve and the second multi-way switch valve to make switching after the cleaning solution flows to the retention flow path and the injection flow path while the sample injected into the downstream analysis flow path is fed to the column.

7. The chromatograph according to claim 1, further comprising a controller configured to control the state switch valve, the measuring pump, and the cleaning pump, wherein the controller is configured to control the state switch valve to make switching to the first state and is configured to control the measuring pump to suction the sample from the sample container into the retention flow path while the needle is inserted in the sample container, the controller is configured to control the state switch valve to make switching to the second state such that, after the sample is suctioned into the retention flow path, the suctioned sample flows from the retention flow path through the injection flow path to the downstream analysis flow path together with the mobile phase delivered by the high-pressure pump, and the controller is configured to control the state switch valve to make switching to the first state and is configured to control the cleaning pump to deliver a cleaning solution to the retention flow path and the injection flow path through the low-pressure flow path while the sample injected into the downstream analysis flow path is delivered to the column.

8. The chromatograph according to claim 7, wherein the controller is configured to control the first multi-way switch valve and the second multi-way switch valve to make a pressure applied by measuring pump for suctioning the sample is transmitted to needle when the state switch valve is switched to the first state.

9. The chromatograph according to claim 8, wherein
the controller is configured to control the first multi-way switch valve and the second multi-way switch valve to make switching after the cleaning solution flows to the retention flow path and the injection flow path while the sample injected into the downstream analysis flow path is fed to the column.

10. A sample injection apparatus that injects a sample into a mobile phase that flows through an analysis flow path that extends from a high-pressure pump to a column in a chromatograph, the analysis flow path including an upstream analysis flow path comprising the high-pressure pump and a downstream analysis flow path comprising the column, the sample injection apparatus comprising:
   a retention flow path that includes a needle at a downstream end and holds the sample suctioned from a sample container through the needle;
   an injection flow path that includes an injection port at an upstream end and serves to inject into the analysis flow path, the sample injected from the needle into the injection port;
   a low-pressure flow path having an upstream end connected to a measuring pump and a cleaning pump; and
   a state switch valve that switches between a first state and a second state, the first state being a state in which the upstream analysis flow path and the downstream analysis flow path are connected to each other and a downstream end of the low-pressure flow path and an upstream end of the retention flow path are connected to each other, the second state being a state in which the upstream analysis flow path and the upstream end of the retention flow path are connected to each other and a downstream end of the injection flow path and the downstream analysis flow path are connected to each other;
   wherein:
   the retention flow path includes an upstream retention flow path on a side of the state switch valve and a downstream retention flow path on a side of the needle,
   the low-pressure flow path includes an upstream low-pressure flow path on a side of the measuring pump and the cleaning pump and a downstream low-pressure flow path on a side of the state switch valve,
   the sample injection apparatus further comprises:
      a switch apparatus that includes a plurality of switch units, each of the switch units being made up of a combination of the upstream retention flow path, the injection flow path, the state switch valve, and the downstream low-pressure flow path,
      a first multi-way switch valve that is provided in a midway along the retention flow path and makes switching of one of the upstream retention flow paths connected to the downstream retention flow path on a side of the downstream end of the retention flow path, and
      a second multi-way switch valve that is provided in a midway along the low-pressure flow path and makes switching of one of the downstream low-pressure flow paths connected to the upstream low-pressure flow path on a side of an upstream end of the low-pressure flow path.

11. The sample injection apparatus of claim 10, wherein the sample injection apparatus is configured to inject a sample into a mobile phase flowing through more than one respective analysis flow path, each analysis flow path including the upstream analysis flow path comprising the high-pressure pump and the downstream analysis flow path comprising the column, and the sample injection apparatus comprising, for each analysis flow path, the retention flow path, the injection flow paths, the low-pressure flow path and the state switch valve.

12. The sample injection apparatus of claim 11, wherein for each analysis flow path:
   the retention flow path includes an upstream retention flow path on a side of the state switch valve and a downstream retention flow path on a side of the needle,
   the low-pressure flow path includes an upstream low-pressure flow path on a side of the measuring pump and the cleaning pump and a downstream low-pressure flow path on a side of the state switch valve, and
   the sample injection further includes:
      a switch apparatus that includes a switch unit, the switch unit being made up of a combination of the upstream retention flow path, the injection flow path, the state switch valve, and the downstream low-pressure flow path,
      a first multi-way switch valve that is provided in a midway along the retention flow path and makes switching of the upstream retention flow path connected to the downstream retention flow path on a side of the downstream end of the retention flow path, and
      a second multi-way switch valve that is provided in a midway along the low-pressure flow path and makes switching of the downstream low-pressure flow path connected to the upstream low-pressure flow path on a side of an upstream end of the low-pressure flow path.

13. The sample injection apparatus according to claim 12, further comprising a controller configured to control the state switch valve, for each analysis flow path, the measuring pump, and the cleaning pump, wherein
   the controller is configured to control the state switch valve to make switching to the second state and is configured to control the measuring pump to suction the sample from the sample container into the retention flow path while the needle is inserted in the sample container,
   the controller is configured to control the state switch valve to make switching to the first state such that, after the sample is suctioned into the retention flow path, the suctioned sample flows from the retention flow path through the injection flow path to the downstream analysis flow path with the mobile phase delivered by the high-pressure pump, and
   the controller is configured to control the state switch valve to make switching to the second state and is configured to control the cleaning pump to deliver a cleaning solution to the retention flow path and the injection flow path through the low-pressure flow path while the sample injected into the downstream analysis flow path is delivered to the column.

14. The sample injection apparatus according to claim 13, wherein
   the controller is configured to control for each analysis flow path the first multi-way switch valve and the second multi-way switch valve to make switching to the upstream retention flow path and the downstream low-pressure flow path included in the switch unit.

15. The sample injection apparatus according to claim 14, wherein the controller is configured to control for each analysis flow path the first multi-way switch valve and the second multi-way switch valve to make switching after the cleaning solution flows to the retention flow path and the injection flow path while the sample injected into the downstream analysis flow path is fed to the column.

16. The sample injection apparatus according to claim 10, further comprising a controller configured to control the state switch valve, the measuring pump, and the cleaning pump, wherein the controller is configured to control the state switch valve to make switching to the first state and is configured to control the measuring pump to suction the sample from the sample container into the retention flow path while the needle is inserted in the sample container, the controller is configured to control the state switch valve to make switching to the second state such that, after the sample is suctioned into the retention flow path, the suctioned sample flows from the retention flow path through the injection flow path to the downstream analysis flow path with the mobile phase delivered by the high-pressure pump, and the controller is configured to control the state switch valve to make switching to the first state and is configured to control the cleaning pump to deliver a cleaning solution to the retention flow path and the injection flow path through the low-pressure flow path while the sample injected into the downstream analysis flow path is delivered to the column.

17. The sample injection apparatus according to claim 16, wherein the controller is configured to control the first multi-way switch valve and the second multi-way switch valve to make a pressure applied by measuring pump for suctioning the sample is transmitted to needle when the state switch valve is switched to the first state.

18. The sample injection apparatus according to claim 17, wherein the controller is configured to control the first multi-way switch valve and the second multi-way switch valve to make switching after the cleaning solution flows to the retention flow path and the injection flow path while the sample injected into the downstream analysis flow path is fed to the column.

* * * * *